US010019999B2

(12) United States Patent
Rao

(10) Patent No.: US 10,019,999 B2
(45) Date of Patent: *Jul. 10, 2018

(54) DATA PROCESSING METHOD AND SYSTEM

(71) Applicant: Alibaba Group Holding Limited, Grand Cayman (KY)

(72) Inventor: Junxue Rao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,088

(22) Filed: Apr. 6, 2017

(65) Prior Publication Data
US 2017/0213562 A1    Jul. 27, 2017

Related U.S. Application Data

(63) Continuation of application No. 14/553,599, filed on Nov. 25, 2014, now Pat. No. 9,653,083.

(30) Foreign Application Priority Data

Nov. 27, 2013    (CN) .......................... 2013 1 0616943

(51) Int. Cl.
| G10L 19/00 | (2013.01) |
| G10L 19/018 | (2013.01) |
| G06F 3/16 | (2006.01) |
| G10L 25/78 | (2013.01) |
| H04R 3/00 | (2006.01) |
| H04B 11/00 | (2006.01) |

(52) U.S. Cl.
CPC ............ *G10L 19/018* (2013.01); *G06F 3/162* (2013.01); *G06F 3/165* (2013.01); *G10L 25/78* (2013.01); *H04B 11/00* (2013.01); *H04R 3/00* (2013.01); *H04R 2420/07* (2013.01); *H04R 2499/11* (2013.01)

(58) Field of Classification Search
None
See application file for complete search history.

(56) References Cited

U.S. PATENT DOCUMENTS

| 7,190,882 B2 * | 3/2007 | Gammenthaler | G08B 13/19647 348/143 |
| 7,414,187 B2 | 8/2008 | Park et al. | |

(Continued)

OTHER PUBLICATIONS

Bender, et al., "Techniques for data hiding", Proceedings of SPIE—The International Society for Optical Engineering, vol. 2420, Mar. 23, 1995, pp. 164-173.

(Continued)

*Primary Examiner* — Satwant Singh
(74) *Attorney, Agent, or Firm* — Lee & Hayes, PLLC

(57) ABSTRACT

The present disclosure relates to a data processing method and system. The method includes obtaining network data and a sound wave synthesized with the network data by a terminal, the sound wave being obtained by performing an encoding conversion on resource data; and according to an operation performed by a user on the network data on the terminal, invoking an audio playback apparatus of the terminal to play the sound wave synthesized with the network data to terminals of one or more users nearby.

20 Claims, 5 Drawing Sheets

(56) References Cited

U.S. PATENT DOCUMENTS

| | | | |
|---|---|---|---|
| 8,451,882 B2 | 5/2013 | Matsuoka | |
| 8,745,259 B2* | 6/2014 | Deinhard | H04L 65/4084 709/217 |
| 9,653,083 B2* | 5/2017 | Rao | G10L 19/008 |
| 2002/0066097 A1 | 5/2002 | Hattori et al. | |
| 2002/0077818 A1 | 6/2002 | Shieh | |
| 2004/0117365 A1 | 6/2004 | Schlageter et al. | |
| 2009/0241163 A1* | 9/2009 | Seo | H04N 21/4305 725/139 |
| 2012/0045002 A1 | 2/2012 | Zivkovic | |
| 2013/0197918 A1* | 8/2013 | Ansell | G10L 19/00 704/500 |
| 2015/0149186 A1 | 5/2015 | Rao | |

OTHER PUBLICATIONS

Metz, "Why Some are Turning to Sound for Mobile Payments and More", retrieved on Feb. 5, 2015 at <<http://www.technologyreview.com/news/518091/why-some-are-turning-to-sound-for-mobile-payments-and-more/>>, MIT Technology Review, Aug. 20, 2013, 1 page.

Office action for U.S. Appl. No. 14/553,599, dated Sep. 8, 2016, Rao, "Data Processing Method and System", 10 pages.

PCT Search Report and Written Opinion dated Feb. 26, 2015 for PCT Application No. PCT/US14/67439, 12 Pages.

Roettgers, "Ultrasonic networking: your devices are talking and you can't hear a thing", retrieved on Feb. 5, 2015 at <<https://gigaom.com/2013/08/09/ultrasonic-networking-your-devices-are-talking-and-you-cant-hear-a-thing/>>, Tech News and Analysis, Aug. 9, 2013, 6 pages.

Smus, "Ultrasonic Networking on the Web", retrieved on Feb. 5, 2015 at <<http://smus.com/ultrasonic-networking/>>, Aug. 8, 2013, 4 pages.

The European Office Action dated Jul. 26, 2017 for European patent application No. 14812106.4, a counterpart foreign application of U.S. Pat. No. 9,653,083, 7 pages.

Summons to Attend Oral Proceedings dated Apr. 5, 2018 for European patent application No. 14812106.4, a counterpart foreign application of U.S. Pat. No. 9,653,083, 7 pages.

* cited by examiner

DATA PROCESSING METHOD AND SYSTEM

CROSS REFERENCE TO RELATED PATENT APPLICATION

This application claims priority to and is a continuation of U.S. patent application Ser. No. 14/553,599 filed Nov. 25, 2014, entitled "DATA PROCESSING METHOD AND SYSTEM," which claims foreign priority to Chinese Patent Application No. 201310616943.2 filed on Nov. 27, 2013, entitled "Data Processing Method and System", which applications are hereby incorporated by reference in their entirety.

TECHNICAL FIELD

The present disclosure relates to the field of data processing, and in particular, to data processing methods and systems.

BACKGROUND

Existing technologies have situations in which resource data is shared via a network. A user can use a terminal to visit a website and open a web page on a terminal used by the user at that time, with the web page providing the user with resource data that the website wants to promote. For example, a user may open a browser in a terminal device used thereby, and click a uniform resource locator (URL) link at an address bar of the browser to request an access to a certain website, such as, enter an address of the website in the browser and click a "visit" button. At that time, a server of the website may obtain the access request from the user, load and display web page content/web page data (network data) of the website to the browser. At the same time, the web page content may further include window content popped up in a form of a pop-up window, such as a display window of "weather forecast" (resource data) is popped up to push information of the weather forecast to the user for viewing and sharing. In this manner, once the user visits the website, sharing and pushing of resource data can be realized, and any user who visits the website via a terminal can obtain valuable resource data. However, such an approach can only share resource data with users who specifically visit the website, and thus the propagation range is narrow, with data sharing and transmission being still difficult and inconvenient. In addition, when valuable resource data is transmitted to the user, the user still needs to install a dedicated application program APP, driver, etc., that is capable of parsing the received resource data on his/her terminal device. Otherwise, the user cannot obtain the valuable resource data, for example, a sign of "data cannot be displayed" may show up.

As can be seen from the above, the existing technologies of sharing and transmitting resource data to facilitate provision of services to users (such as, sharing more viewable real-time data information and information with limited timelines, e.g., weather information/news, the latest App URL information, and prompts for donation account, etc.) still have the following deficiencies:

Sharing and transmission (propagation) of resource data needs a corresponding program, App, or the like, to be installed on a terminal device used by a user, and the resource data of a website can only be obtained by the user who visits the website using that terminal. A user directly accessing network data via a terminal device fails to enjoy and share the obtained resource data in a faster and real-time manner. Other users cannot share the resource data quickly and in real time. Thus, only a single object is served, having a poor real-time performance, low efficiency and slow speed of sharing, propagation and transmission of resource data, with complex and inconvenient sharing and propagation. Further, such inconvenient transmission and sharing further causes a limited scope of transmission and sharing of the resource data and a small push/promotion range, which makes it inconvenient to spread the resource data to more users and does not facilitate sharing of valuable data information. If most users get the resource data by passing from mouth to mouth or manual sharing, the efficiency is apparently low and the cost is high.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In view of the aforementioned deficiencies in the existing technologies, such as the difficulty in implementing a simple and convenient transmission/propagation of resource data, which consequently causes a decrease in transmission speed, low transmission and propagation efficiency, a low propagation speed, a narrow propagation scope, and a poor real-time performance, and is adverse to sharing the resource data to more users, etc., a primary objective of the present disclosure is to provide a method and a system of data processing so as to improve the efficiency of data sharing, propagation and transmission, and make it simple and convenient to share data. Furthermore, the issues of improving the speed and efficiency of data transmission and expanding the range of data propagation can be resolved. Moreover, an issue of data sharing and transmission without interference can also be addressed.

To solve the above technical problems, the objective of the present disclosure provides a data processing method, which comprises: obtaining network data and a sound/acoustic wave synthesized with the network data by a terminal, the sound wave being generated by performing an encoding conversion on resource data; and invoking an audio playback apparatus of the terminal according to an operation performed by a user on the network data in the terminal to play the sound wave synthesized with the network data to terminals of one or more users nearby.

In addition, a data processing system corresponding to the method is also provided, which comprises: an encoding and synthesis module used for converting resource data into a sound wave through encoding; a triggering module to, when a terminal obtains network data and a sound wave synthesized with the network data, invoke an audio playback apparatus of the terminal to play the sound wave synthesized with the network data to terminals of one or more users nearby according to an operation performed by a user on the network data on the terminal. Compared with the existing technologies, the technical solution of the present disclosure has the following beneficial effects:

By making use of a large amount of existing network data, the disclosed method and system encode resource data into a sound wave, which is synthesized with network data in a simple and convenient way. A user only needs to trigger the network data in a terminal device, and playback of the sound wave synthesized with the network data is triggered at the same time. For example, the sound wave representing the resource data is sent out to the surroundings via a sound apparatus/audio playback apparatus (such as a sound adapter, a power amplifier, a loudspeaker, etc.) of the terminal device. In the surrounding environment, sound receiving apparatuses (such as microphones) of terminal devices of other users can receive and parse the sound wave to obtain the resource data upon intercepting the sound wave, so that the resource data can be shared with more users in a simple, convenient and efficient manner. Therefore, the method of propagation of resource data is simplified, and the speed of propagation is improved, thus improving the transmission efficiency and expanding the propagation range of the resource data. The resource data can be shared with more users in a surrounding environment conveniently and efficiently. Furthermore, when the sound wave of the resource data is located in a non-audible frequency band, the resource data can be shared with more users in the surrounding environment without any interference.

BRIEF DESCRIPTION OF THE DRAWINGS

The accompanying drawings described herein are used for further understanding of the present disclosure and constitute a part of the present disclosure. The schematic embodiments and the description thereof in the present disclosure are used to illustrate the present disclosure, and should not be construed as any improper limitation to the present disclosure. In the accompanying drawings.

DETAILED DESCRIPTION

Figure 1:
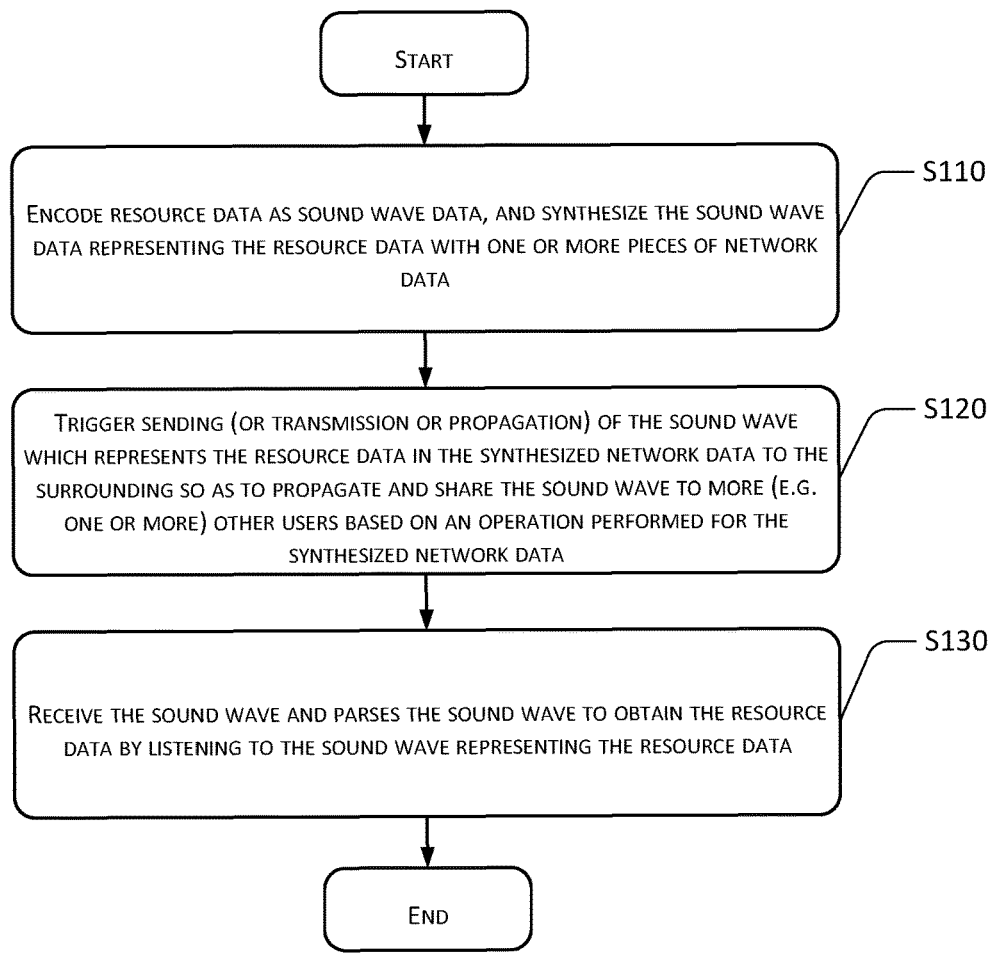
FIG. 1 is a flow chart of an example data processing method according to the present disclosure.

An idea of the present disclosure is that, when a user triggers downloaded network data in a terminal device thereof or network data that is accessed via the terminal device, propagation or transmission of a sound/acoustic wave which is encoded and synthesized with the network data is triggered at the same time. The sound wave corresponds to sound wave data obtained by encoding resource data through a Web Audio application program interface (Web Audio API). One or more terminal devices of one or more users near the user, if supporting the Web Audio API, can receive and parse the sound wave to obtain the resource data that the user wants to share and transmit upon detecting and intercepting the sound wave.

For example, a user clicks a piece of music (or an audio file, audio data) in a web page which the user browses via a terminal device so as to play the music. If a sound wave that represents resource data is synthesized with the music, a playback (or in other words, propagation or transmission) of the sound wave (e.g., a sound wave representing information such as weather information) is also triggered at the same time. In this case, the sound wave can be sent to the surrounding environment by a sound apparatus, such as a high fidelity sound equipment, of the terminal device of the user. Because the Web Audio API is used to encode the resource data into the sound wave and synthesize the sound wave with the music, if one or more users having one or more terminal devices (including the terminal device of the user who clicks the music) are present within a certain range of the surrounding environment, a terminal device supporting the Web Audio API can receive and parse the sound wave to obtain the resource data and enjoy content of the resource data by detecting and intercepting the sound wave. For example, sound receiving apparatuses (such as microphones) of these terminal devices detect and receive the sound wave, and the sound wave can be decoded in these terminal devices so that weather information and the like is displayed to the users of these terminal devices for viewing.

Therefore, the present disclosure takes advantage of a large amount of existing network data, encodes resource data that is to be pushed and shared into sound wave data based on Web Audio API in a simple and convenient manner, and synthesizes the sound wave data into a lot of network data without changing content of the network data. Furthermore, because a terminal device supports HTML5, the terminal device naturally supports the Web Audio API, and hence a process of encoding and synthesis of the sound wave data is simpler, more convenient, and more efficient. A terminal device that provides the resource data and a terminal device that receives the resource data do not need to install a corresponding dedicated APP that parses and receives the resource data. Moreover, since all terminal devices essentially have sound apparatuses (such as loudspeakers) and sound receiving apparatuses (such as microphones), data sending and receiving can be implemented by transmission via a sound wave. Therefore, corresponding/equivalent receiving and sending ports, structures, or driver programs (such as Bluetooth or infrared), etc., for a sender and a receiver are not needed to be configured or constructed specifically, thereby avoiding extra installation configuration for the sender and the receiver, reducing the cost of the terminal devices, and further improving the speed and efficiency of the transmission and propagation. Besides, using the Web Audio API, a determination is made only to which piece, group, or series of network data that synthesis is made into, and which piece of resource data is to be synthesized, and various complicated processing (such as adding an attachment, entering receiver information, etc.) related to the receiver through an APP, for example, is not needed, and the method of data processing is thus simplified. Moreover, the resource data can be shared and propagated to a larger group of people, thereby improving the efficiency of data sharing and propagation. In short, by encoding resource data to sound wave data which is synthesized into a variety of network data, and by means of triggering and/or propagation of the network data, the sound wave can be propagated more easily, more conveniently, more efficiently and in a wider range, thereby achieving simple and convenient, real-time, fast, and interference-free sharing of the resource data.

To make the objectives, technical solutions and advantages of the present disclosure more clearly, the technical solutions of the present disclosure are described in a clear and comprehensive manner with reference to the specific embodiments and corresponding accompanying drawings of the present disclosure. Apparently, the described embodiments are merely a part but not all of the embodiments of the present disclosure. All the other embodiments obtained without any creative effort by one of ordinary skill in the art based on the embodiments in the present disclosure would fall within the protection scope of the present disclosure.

In the present disclosure, one or more terminal devices used by a user may include a cell phone, a computer/personal computer (PC), an iPod, a media player such as Mp3/Mp4/Mp5, a tablet computer/Pad, and the like. Besides, in one implementation, these terminal devices support HTML5, i.e., support Web Audio API. A user herein further includes a website administrator, and a terminal device (including a server device that is operable) used thereby. The user uses these terminal devices, and may use the Web Audio API to encode resource data into sound wave data and synthesize the sound wave data into a large amount of network data that can be accessed and requested, and play the sound wave representing the resource data without any interference, thereby achieving interference-free propagation and sharing of the resource data. The interference-free described herein may refer to as not affecting network data itself, e.g., not affecting the transmission, access, processing (such as music playback), etc., of the network data.

Moreover, a user having resource data can use the terminal device to directly perform encoding and synthesis of network data of a visited website, or perform encoding and synthesis of local network data of the user and uploading the encoded and synthesized network data to the website (e.g. a server). Alternatively, a website directly encodes and synthesizes provided resource data with network data of the website to facilitate more widespread sharing of the resource data when more users access the network data through the website.

Figure 3:
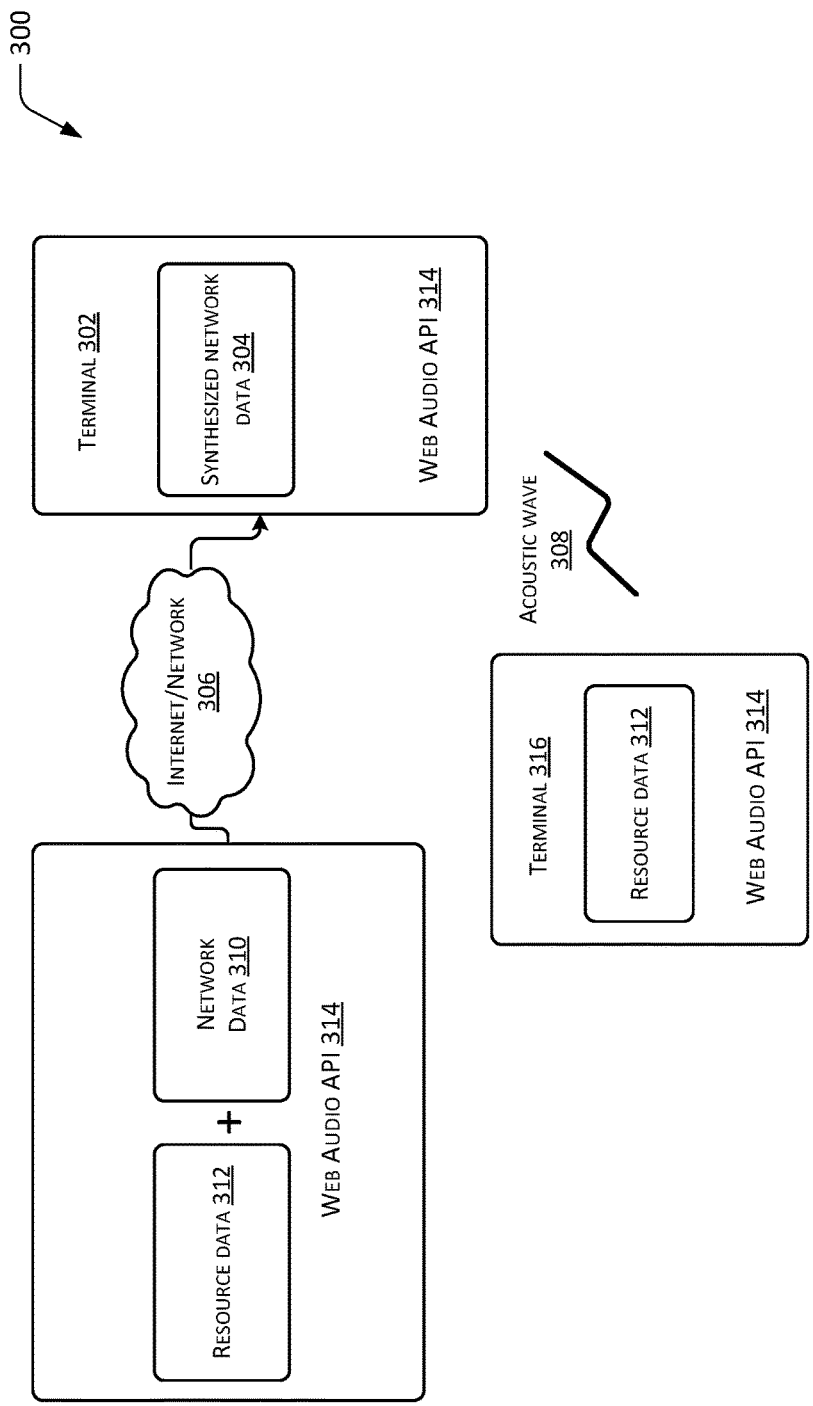
FIG. 3 is a schematic diagram of an example data processing method according to the present disclosure.

Referring to FIG. 1 and FIG. 3, FIG. 1 is a flow chart of an example data transmission processing method according to the present disclosure, and FIG. 3 is a schematic diagram of an example data processing method according to the present disclosure.

S110 encodes resource data as sound wave data, and synthesizes the sound wave data representing the resource data with one or more pieces of network data.

Network data synthesized with a sound wave can be formed by encoding and synthesis. Such network data carries the sound wave representing resource data, and can be referred hereinafter as synthesized network data. The synthesized network data can be stored or transmitted/uploaded to various accessible (for example, web access and request) websites or data sharing devices. A conversion of resource data into sound wave and a synthesis associated with the sound wave include: a server end converting the resource data into the sound wave, synthesizing the network data with the sound wave, and storing the synthesized network data at the server end to facilitate sharing; or a client (such as a terminal device used by a user) converting the resource data into the sound wave, synthesizing the network data with the sound wave, and uploading the synthesized network data to a server to facilitate sharing.

Specifically, for example, a user having resource data may use a terminal device thereof to encode the resource data that is to be propagated (or in other words, to be shared with more users) to obtain a sound wave, synthesize the sound wave with network data so as to form the synthesized network data, and upload the synthesized network data to accessible websites or sharing devices, so as to provide the synthesized network data to any user who accesses the websites or the sharing devices. Alternatively, a website administrator having resource data uses a terminal device (including a server device that can be operated, for example) thereof to encode the resource data into a sound wave and synthesize the sound wave with the network data so as to form the synthesized network data, and puts the synthesized network data in the website to provide the synthesized network data for users who access the website.

The network data may include data that the user obtains using the terminal device via a web access, i.e., various types of data possessed by the website, e.g., various types of data provided by the website and loaded in a web page in response to an web access or request of the user using the terminal device. Alternatively, the network data may include various types of data that the user uses the terminal device to download, copy, receive, compile/edit, or store in the terminal device through other methods, e.g., a large amount of web-based audio data that has been stored. The network data may be requested, accessed, triggered or run (for example, music playback) in the terminal device by the user, i.e., can be operated by the user.

The resource data may include various types of data that are desired to be widely propagated to and shared with many users conveniently and quickly, such as, weather information/weather forecast (information), download address information of an App, an advertisement, a donation account, a traffic condition, and stored information obtained by scanning a quick response code, etc., which are desired to be provided to the public for sharing in real time, regularly or irregularly. The resource data can be obtained through web access, downloading, copying, local compiling/editing, and the like.

If valuable resource data that is time-sensitive can only be accessed from a specific website by each user using a terminal device, copied from other specific terminal devices or transmitted to all shared targets one by one after the user obtains information (such as a cell phone number or an e-mail address) of the shared targets via the terminal device, this does not facilitate a simple and convenience transmission thereof, and further does not facilitate simple and convenient promotion, propagation, participation and sharing thereof to a broader scope of user groups that have terminal devices but did not or cannot access the website. Therefore, in a technical solution of the present disclosure, the resource data can be encoded into sound wave data using Web Audio API so as to be combined with one or more pieces of network data and used as an additional part of the one or more pieces of network data. With an operation performed by the user on the one or more pieces of network data, for example, accessing, requesting to trigger or running the network data, the resource data can be pushed or spread to other users who use terminal devices within a surrounding environment. The network data can be used as a carrier or a trigger source of the sound wave (the resource data), so that the resource data is combined with the network data after being encoded into the sound wave. The sound wave, acting as an attached part of the network data, does not affect the content of the network data, i.e., the sound wave can be propagated in an interference-free manner without affecting the network data itself and the running and processing thereof, for example.

In an embodiment, the resource data may be encoded into the sound wave through the Web Audio API, i.e., encoded into data existing in a form of a sound wave (or in other words, sound wave data, with the sound wave data being a digital (binary) form of the sound wave), and can be converted back to the sound wave (an analog form) through a digital-to-analog conversion. The sound wave (sound wave data) represents the resource data. Furthermore, the sound wave data is synthesized with one or more pieces of network data to form one or more pieces of network data synthesized with the sound wave.

In an embodiment, the network data that is synthesized with the sound wave may be used as a carrier of the sound wave representing the resource data, and therefore, the synthesized network data further includes the sound wave (sound wave data) obtained by encoding the resource data.

In another embodiment, the network data synthesized with the sound wave may be used as a trigger source of the sound wave representing the resource data, and therefore, the synthesized network data includes the sound wave obtained by encoding the resource data. Moreover, an operation activity (event) associated with the network data is bound to a trigger associated with the sound wave, i.e., bound to an event listener. For example, an operation event associated with the network data is bound to an invocation (i.e., a trigger) of playback of the sound wave. Specifically, a JavaScript event listener may be used to define an addition of processing such as invoking playback, transmission or transfer, etc., of the sound wave for a certain operation event of the user on the network data. For example, a JavaScript event listener in a PC is used to define, for a mouse onhover event on network data, a method for playing a sound wave. Therefore, by listening to the onhover event, the method for playing the sound wave can be invoked when the event is processed. Accordingly, the user activity of moving a mouse to the network data is delivered to a behavior event listener interface (JavaScript listener interface), and the onhover event is invoked automatically to execute processing. If the onhover event includes an invocation of playback of the sound wave, the activity of moving the mouse to the network data triggers the playback of the sound wave at the same time.

The sound wave obtained by encoding the resource data may be a high-frequency sound wave or a low-frequency sound wave that is inaudible to humans, i.e., the resource data is encoded into the high-frequency sound wave or low-frequency sound wave having frequencies (frequency bands) other than those of audible waves. The frequency interval of an audible wave ranges from 20 Hz to 20 kHz. Frequency intervals of sound waves other than the audible wave are greater than 20 kHz or less than 20 Hz. For example, ultrasonic waves (frequencies thereof are between 20 kHz and 20 GHz), or infrasonic waves (frequencies thereof are less than 20 Hz).

The terminal device used by the user supports the Web Audio API, and the Web Audio API is a high-level JavaScript API used for processing and synthesizing audio data in a web application (such as a web page and a Web App). The script API, i.e., the Web Audio API, may be a powerful audio engine having functions, such as mixing, processing and filtering, of a desktop audio processing device. Therefore, by using the engine Web Audio API, resource data desired to be widely propagated and shared can be encoded in a simple and convenient manner into an ultrasonic or infrasonic frequency band due to characteristics of the script API so as to be synthesized with existing network data on the web. The method of synthesis may be: binding with an event listener associated with the network data so as to use the network data as a trigger source, adding to the network data so as to use the network data as a carrier of the sound wave, etc. Moreover, due to the universality of HTML5 on various kinds of terminal device (such as PC and cell phone, etc.) platforms, data transmission and resource sharing with each other is very easy and convenient without interfering normal operation/running, and accesses of network data of the user. Therefore, the terminal device does not need to install any APP, perform tedious processing of the resource data, or specifically configure a signal transmission interface, driver, etc.

The present embodiment is explained hereinafter mainly using a large amount of existing web-based audio data as an example.

A large amount of network data, such as audio data, exists in the web. Since the audio data is also in a binary form of an audible sound wave, the audio data can be used as a carrier of the sound wave. In this way, the sound wave of the resource data can be synthesized into a frequency band of a sound wave of the audio data. For example, the resource data can be synthesized into an ultrahigh frequency band (with frequency greater than 20 kHz) or ultralow frequency band (with frequency less than 20 Hz) of a sound wave of the audio data, i.e., the sound wave representing the resource data may be located in the ultrahigh frequency band or the ultralow frequency band.

Specifically, an online music in the web is used as an example. An ultrahigh frequency or ultralow frequency in a sound wave frequency band of the online music can carry or be placed with the sound wave obtained from audio encoding of the resource data. An audible sound wave of the music is carried by or placed in an audible frequency band within a sound wave frequency band of the music. For example, when a user accesses a music website server via a browser of a terminal device, an online music URL is loaded. The user clicks the URL (a user behavior/operation event), the music is loaded through the URL and played. The sound wave that represents the resource data and has been synthesized into the ultrahigh or ultralow frequency band of the music is played at the same time. During the playback, the sound wave in the audible frequency band of the music, and the sound wave representing the resource data in the ultrahigh frequency band or ultralow frequency band of the music are propagated to the surrounding environment through a sound apparatus such as a loudspeaker. Humans can hear the sound wave within the audible frequency band, but cannot hear the ultrasonic wave or infrasonic wave representing the resource data. However, the ultrasonic wave or infrasonic wave that is not audible to humans can be listened and received by sound receiving apparatuses (such as microphones) of other terminal devices. Since the sound wave of the resource data is located within an inaudible frequency band, the playback thereof does not affect/interfere the user when the user listens to the music (the audible wave).

Figure 2:
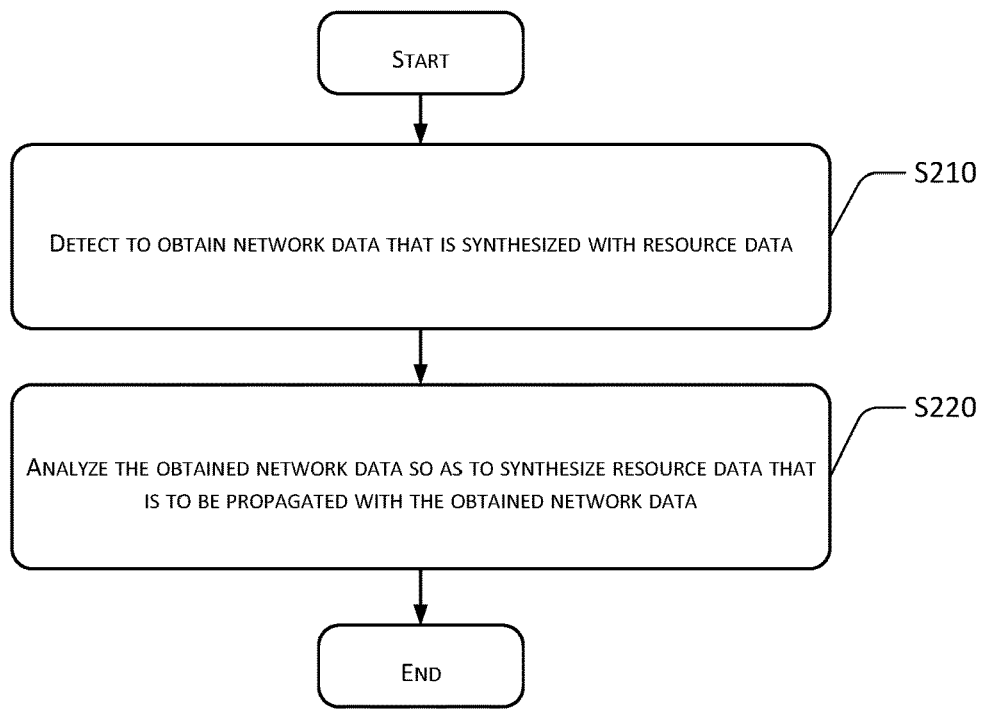
FIG. 2 is a flow chart of an encoding and synthesis process using a Web Audio application programming interface (API) in an example data processing method according to the present disclosure.

FIG. 2 shows a process of encoding and synthesis using Web Audio API, which is merely an example herein, and the present disclosure is not limited to this method.

Block S210 detects to obtain network data that is synthesized with resource data.

There are a lot of network data, and which type or which piece of network data is to be synthesized with resource data may be determined in advance, and therefore, these pieces of network data need to be detected and obtained. In one specific implementation, desired network data may be detected and obtained from among a lot of network data via the Web Audio API.

A terminal device used by a user supports HTML5 that describes web resources, i.e., supports the Web Audio API. In HTML5, JavaScript can be used to conveniently manipulate a Document Object Model (DOM) element in HTML5, and the Web Audio API is a JavaScript API. Therefore, the Web Audio API can conveniently manipulate the DOM element. Different tags/identifiers exit in a DOM structure, for example, AUDIO, SPAN, IMG, and A, etc., which identify types of network data, with different network data having different identifiers.

The Web Audio API uses its script, JavaScript, to control a DOM element, i.e., operate and process the DOM, so as to detect and obtain network data to be synthesized with resource data that is to be propagated or transmitted from a web page. A method of detecting a web audio file to be synthesized with resource data may include determining which network data is a web audio file based on an AUDIO identifier in a DOM structure from among a series of network data, where one AUDIO identifier represents one piece of audio data. In a specific process of synthesis, for example, the Web Audio API detects an AUDIO identifier that exists in a web page using a DOM operation of JavaScript thereof, and obtains a Uniform Resource Locator (URL) of audio data corresponding to the AUDIO identifier.

In addition, other identifiers such as SPAN, IMG, A, etc., may represent other network data such as texts, pictures, and text links. The Web Audio API may also detect these identifiers existing in the web page using the DOM operation of the script thereof, and obtain respective network data corresponding to these identifiers respectively.

Block S220 analyzes the obtained network data so as to synthesize resource data that is to be propagated with the obtained network data, thereby obtaining synthesized network data.

In one specific implementation of block S210, the synthesis processing may be performed by the Web Audio API by using JavaScript thereof to analyze the obtained web audio data that will be synthesized with the resource data to be transmitted or propagated, e.g., analyze a frequency band structure thereof. The frequency band structure may include: an audible frequency band where the audio data is located, and an idle part other than the audible frequency band, such as an ultrasonic frequency band or an infrasonic frequency band. The idle part may be a frequency band (waveband) occupied by a wave other than the audible wave (music).

The frequency band structure is analyzed to further determine whether the idle part has been used, and if the idle part is not used, for example, no other sound wave is located in the ultrasonic frequency band/infrasonic frequency band indicated by the idle part, the resource data may be encoded in a form of an ultrasonic wave or an infrasonic wave, and is placed in or carried by the idle part. Furthermore, the Web Audio API may also construct a filter to remove audio data having frequency higher than 20 kHz, i.e., remove a sound wave that may exist in the idle part, so as to satisfy a condition that the idle part is not used at any time.

Specifically, in one example, the Web Audio API uses a DOM operation of JavaScript thereof to detect an AUDIO tag that exists in the web page. After a URL of audio data corresponding to the AUDIO tag is obtained, the audio data of the URL link may also be loaded via JavaScript of the Web Audio API. A frequency interval (namely, a frequency band structure) of the audio data is analyzed to obtain an idle part in a sound wave frequency band of the audio data, i.e., the idle part as an available frequency band. Thus, by using the script thereof, the Web Audio API can encode the resource data into the sound wave which is within the available frequency band.

For instance, encoding resource data and synthesizing the encoded resource data to an ultrasonic frequency band of an audio file is used as an example of the entire process of synthesis processing.

A JavaScript file is added to a web page. A program instruction of the JavaScript file controls that network data needed for synthesis is read first when the web page is loaded, for example, controls detection of an AUDIO identifier of DOM so as to obtain an audio file (audio file or music) desired for synthesis. Then, a frequency interval of the audio file is analyzed, and preferably, a filter may further be constructed to remove audio data having frequency is greater than 20 kHz, i.e., remove a sound wave that may exist in an idle part, so as to satisfy a condition that the idle part is not used. Thereafter, because the audio data can be conveniently processed, for example, filtered, synthesized and/or decomposed, in a form of a byte array, in this example, Web Audio API may be used to encode specified resource data such as a download URL of an App, in a form of base 64, and synthesize the encoded resource data into a frequency band interval, which is obtained after the analysis of the audio data, i.e., the indicated and filtered idle part, namely, a frequency band of 21 kHz-41 kHz. In other words, the URL is encoded into an ultrasonic wave, and is carried in such frequency band. The resource data, namely, a sound wave, that is synthesized into the frequency band of 21 kHz-41 kHz may have a format definition, which includes three parts: a data header, data content, and a data tail.

The data header may include a type of resource data (URL, text, or the like), a total length of the resource data, a starting position and an ending position of resource data content, and a summary type of the resource data content. The data content follows closely after the data header, and is the resource data content. The data tail follows closely after the data content, and is the summary of the resource data content, being used for checking data integrity.

The Web Audio API processes a digital signal, and therefore, for its processing of an audio data, also processes a binary code of the audio data. Data in different frequency bands can be distinguished from each other by the code. For example, a location for storing audible wave data of the audio data may be provided with an indication of an audible frequency band, such as [20 Hz to 20 kHz], i.e., data stored thereafter is audible audio data; a location for storing data of an ultrasonic wave representing the resource data (an App download link) may be provided with an indication of an ultrasonic frequency band, such as [20 kHz to 20 GHz], i.e., data stored thereafter is ultrasonic data. When being played, the audible wave and the ultrasonic wave do not interfere with each other, and the playback thereof just needs to be triggered.

Furthermore, the format definition of the resource data may include a frequency band of the ultrasonic or the infrasonic where the resource data is located. For example, the frequency band information may be written into the data header. Moreover, the network data, i.e. the music in the audible wave range, also has a format definition, and the format definition thereof also includes a frequency band where the music is located, so that which data is the resource data and which data is the network data can be distinguished from each other based on different frequency bands where the resource data and the network data are located. The network data is simply used as a carrier of the resource data.

Furthermore, due to the difference between frequency bands, the audio data and ultrasonic data are located on different frequency bands and do not interfere with each other; playback times can be set up arbitrarily on different frequency bands, i.e., a sending time may be set up for the resource data synthesized in the network data. Therefore, the resource data can be sent out when the network data is triggered, or the resource data is sent out at a preset time or occasion during execution or use of the network data (for example, during music playback). For example, a playback time may be set: a playback of the audible-wave audio data is started fifteen seconds after a playback event is triggered, and the ultrasonic resource data is played immediately after the playback event of the audio data is triggered or five seconds after the playback of the audio data, etc. These settings and playback operations may all be controlled through the script of the Web Audio API.

In this manner, when the music is loaded and played, the sound wave (ultrasonic wave or infrasonic wave) that represents the resource data and is located in the ultrahigh frequency band or ultralow frequency band is also transmitted (i.e., played) along with the playback of the music. Moreover, the sound wave and the music can be intercepted and received by sound receiving apparatuses of terminal devices which also support HTML5, i.e., support the Web Audio API. The Web Audio API may parse the received sound wave and music to obtain content representing the resource data based on the format definition included in the sound wave, perform integrity check of the data, and display the resource data, e.g., provide a prompt of opening an URL if the resource data is the URL. The music is pure audio data, which has no content to display after being parsed.

In addition, a large amount of other types of existing data in the web are non-audio data, and the non-audio network data can also be used to be synthesized with the resource data. Similar to the example for the audio data:

A JavaScript file is added to a web page. A program instruction of the JavaScript file controls that network data (a picture) which can be used for synthesis is read first when the web page is loaded, for example, controls detection of an IMG identifier of DOM that may exist in the web page so as to obtain a node of the DOM, i.e., a picture. Since non-audio data, such as a picture, is not a sound wave carrier, and does not have a frequency band structure of a sound wave (or in other words, all frequency bands thereof are idle parts), the Web Audio API may similarly be used to encode resource data into a sound wave according to the foregoing method of synthesis with an audio file, or even encode the resource data in real time, i.e., immediately encode a piece of resource data upon receiving that piece. Moreover, the sound wave may be an ultrasonic wave or an infrasonic wave (i.e., ultrasonic data or infrasonic data) located in an ultrahigh frequency band or an ultralow frequency band. Same as the example for the audio data, the infrasonic/ultrasonic wave representing the resource data may also have a format definition, which includes three parts: a data header, data content, and a data tail. Furthermore, the data header includes frequency band information of the resource data.

However, during synthesis, as the picture is not audio data, when the sound wave is synthesized with the picture, the playback and the sending of the sound wave may be bound to an event listener associated with the picture so that the picture is used as a trigger source of the sound wave to facilitate the use for external access. For example, the detected picture is analyzed first to determine an operation event listener of the picture, i.e., to determine a user operation event associated with the picture that can be listened. As described in the specific embodiment of the foregoing synthesis method, the playback (action) of the sound wave may be added to the JavaScript event listener of the picture, for example, a mouse onhover event listener that is used for invoking event processing corresponding to an onhover event in which a mouse moves to the picture, thereby triggering (invoking) the playback (transmission) of the sound wave at the same time. Thus, the synthesized picture (non-audio network data) is formed. Similar to the example in which audio data is used, sound receiving apparatuses of terminal devices which also support HTML5, i.e., support the Web Audio API, receive the sound wave of the resource data. Due to the audio processing capability of the Web Audio API, the Web Audio API parses the received sound wave according to the format definition to obtain the content of the resource data.

In other words, for network data, if a web audio file is selected as an object for synthesis, the synthesis can be completed by directly performing encoding after analyzing a frequency band structure, and placing a ultrasonic wave or a infrasonic wave that represents resource data in an idle part (which is unused according to the analysis) of the frequency band. During music playback of the audio file, the ultrasonic wave or infrasonic wave is sent out (played). If non-audio network data is selected as an object for synthesis, after the resource data is encoded into an ultrasonic wave or an infrasonic wave, the playback processing thereof needs to be bound with an event listener (such as an onhover event listener) associated with the non-audio network data to complete the synthesis. When an event on the network data occurs, for example, when an operation of a user that moves a mouse to the network data occurs (for example, an onhover event occurs), the event is processed, the bound playback processing of the sound wave is invoked (triggered), and the ultrasonic wave or the infrasonic wave is played.

Furthermore, when the network data is of an audio type, the sound wave obtained by encoding the resource data and the network data (audible wave) are located in different sound wave frequency bands, and therefore, the synthesized network data is still audio data as a whole. When the network data is of a non-audio type, the resource data is encoded into a piece of sound wave data, and is bound to an event listener for the network data, and therefore, the synthesized network data is network data carrying the sound wave data.

In an implementation, network data, such as a movie file (a video file in a broad sense), includes an image data part and an audio data part. If this type of files needs to be synthesized with resource data, the audio data part or the image data part may be selected. Due to the advantage of the audio processing of the Web Audio API, the audio data part is preferably selected for synthesis, i.e., the resource data is encoded and synthesized into an ultrasonic or infrasonic frequency band of the audio data part, and the details thereof are the same as the foregoing example of synthesis associated with music. Apparently, the resource data may also be synthesized with the image data part, and is bound to a trigger event listener. The details thereof are the same as the foregoing example of synthesis associated with a picture, and are not redundantly described herein.

As a terminal device that supports HTML5 can use the Web Audio API, encoding resource data, synthesizing the resource data, and even intercepting (receiving) and parsing the resource data are fast, convenient and efficient, i.e., the encoding and decoding speed, and data sharing, transmission and propagation are more efficient, simpler and more convenient, with a wider scope of coverage. The method is simple and has a wide range of sharing and transmission, thereby optimizing technologies of sharing and transmitting resource data efficiently, conveniently and widely. Further, a simple and convenient sharing can be implemented without installing additional software.

For example, a cell phone user A wants to transmit an App download URL to more users. Since a cell phone of the user A who has the resource URL supports HTML5 (Web Audio API), the resource data can be processed without installing a dedicated APP. The user A can encode the URL through the Web Audio API on the cell phone and synthesize the encoded URL into an ultrahigh frequency band of music loaded in a web page that is opened when user A visits a music website, and can further send the synthesized music back to the music website or other websites (servers or other accessible devices) that allow uploading, so that, when other users access the synthesized music using respective terminal devices, the ultrasonic wave is sent out through loudspeakers during music playback. The ultrasonic wave is intercepted and received by microphones of respective cell phones of users B and C which are nearby the other users who access the synthesized music. If both of the cell phones of users B and C support the Web Audio API, the ultrasonic wave is parsed (decoded) to obtain the content of the URL represented by the ultrasonic wave, and the content is displayed. Furthermore, by way of examples, an observatory cooperates with a picture website. In the picture website, weather data (weather information) is used as resource data and is encoded into an ultrasonic wave using the Web Audio API. The playback of the ultrasonic wave is bound to a Javascript onhover event listener for a picture (i.e., synthesized with the picture). When an arbitrary user visits the website via a terminal device and moves a mouse to the picture, event processing is performed and a playback of the ultrasonic wave is invoked. Other terminal devices that support the Web Audio API and are located in the surrounding environment of the user who visits the website can all receive and parse the ultrasonic wave to obtain the weather information.

Therefore, resource data can be shared by means of transmission or propagation of a sound wave. Moreover, transmission/propagation of the sound wave of the resource data (i.e., sharing of the resource data) is actuated simply after a user triggers requested or accessed data, this approach is simple and convenient. Furthermore, as the sound wave synthesized with the encoded resource data by the Web Audio API is located within ultrahigh frequency or ultralow frequency which is not audible to humans, no noise or un-pitched sound other than the music, which would disturb hearing of the user, is generated during a process of playing and sending the sound wave of the resource data. Apparently, no audio interference may be introduced to the user who browses the picture. Therefore, the quality of the original network data is not affected, and no network data is lost. In subsequent operation processing, the integrity and the quality of the network data can be ensured, thereby improving user experience of a user who operates and processes the network data using a client.

For example, a cell phone APP company wants to promote download address information for downloading an APP, and provides the download address information to a music website that cooperates with the company. The music website or the cell phone APP company may also act as a user using a terminal device (including a website administrator, who maintains a website server, using a terminal device) to quickly encode the APP download address information and synthesize the encoded APP download address information into all music or some specified music of the music website using Web Audio API. Once a user visits a web page of the music website via a browser of a terminal device thereof, and clicks to play a piece of music (or clicks a URL of a piece of music so that the music is played while being loaded), a sound wave carrying the APP download address information and synthesized into ultrahigh frequency or ultralow frequency of the music is also played to the surrounding through a loudspeaker. The user and terminal devices near the user can easily detect the sound wave by listening through sound receiving apparatuses such as microphones. If the terminal devices further support the HTML5, i.e., support the Web Audio API, the received sound wave can be parsed quickly to obtain the download address information of the APP.

For another example, a user obtains information of a new store by scanning a quick response code with a terminal device, and wants to transmit and propagate thereof to users nearby. Using the Web Audio API supported by the terminal device, the user synthesizes the new store information quickly (in real time) into music loaded in a web page of a music website that is visited by the user using the terminal device, and uploads the synthesized music to the music website or another accessible device or website that allows file uploading, so that, when another user uses a terminal device to access and play the synthesized music, that terminal device may not only obtain the store information if the terminal device supports the Web Audio API, but also share the new store information with other nearby users whose user information is unknown, so that the new shop information can be shared again in a wider range.

At block S120, based on an operation performed for the synthesized network data, sending (or transmission or propagation) of the sound wave which represents the resource data in the synthesized network data to the surrounding is triggered, so as to propagate and share the sound wave to more (e.g. one or more) other users.

The user can obtain the network data and the sound wave synthesized with the network data, i.e., the synthesized network data, and can perform various user operations for the synthesized network data via the terminal device. Based on the operation of the user on the terminal device, an audio playback apparatus/sound apparatus (a digital-to-analog converter D/A, or a loudspeaker), etc., of the terminal device is invoked to play the sound wave synthesized with the network data to terminal devices of one or more users nearby.

The user operations includes various kinds of operation events or processing for various kinds of synthesized web data, e.g., a user's clicking of music loaded in a web page of a music website visited by a terminal device to perform music playback processing via the terminal device, the user's moving of a mouse to a position of a picture loaded in a web page of a picture website visited by the terminal device to generate a user operation event associated with moving the mouse to the picture via the terminal device, another selection event or keyboard event, etc. A user operation may even be various direct or indirect operations performed by a user with a terminal device thereof for synthesized network data, which is formed by encoding resource data and synthesizing the encoded resource data to accessed network data using the Web Audio API of the terminal device.

Examples of the operations performed for the synthesized network data include an offline or online operation. For the offline operation, for example, a terminal device, which is an iPod, used by a user downloads music from a music website, and when the user opens the music for playing, an ultrasonic wave which is obtained by encoding an App download address and is placed in an ultrahigh frequency band of the music is broadcasted to the surrounding through a loudspeaker of the iPod. For the online operation, for example, a terminal device, which is a cell phone, used by a user visits a music website through a browser, and a URL of music is loaded into the browser of the cell phone during loading of a web page. When the user activates the URL (which is similar to a start button) of the music, the music (music data)

linked to the URL is played while being loaded into the cell phone, and an ultrasonic wave which is obtained by encoding an App download address and is placed in an ultrahigh frequency band of the music is also broadcasted to the surrounding through a loudspeaker of the cell phone. In an online or offline music playback, audio data within an audible frequency band is played after a playback event is triggered. Due to different frequency bands and characteristics of audio processing and differentiating the frequency bands by the Web Audio API, other frequency bands (such as an ultrasonic frequency band and an infrasonic frequency band), which are along with an audible frequency band, may also include sound wave data, and may be controlled by the script API. The sound wave is played when a playback event of the audio data is triggered. Alternatively, the sound wave may be played at a certain preset time after the playback event is triggered as described above. Frequency bands of a sound wave and audio data can be distinguished from each other during implementation such as encoding and storage as described above, which is not redundantly described herein.

The triggering of the sending (or transmission or propagation) of the sound wave which represents the resource data in the synthesized network data to the surrounding includes triggering or invoking sound wave playback processing that is bound to an operation event, or playing the sound wave during music playback processing. For example, the terminal device of the user listens to the aforementioned operation event of moving the mouse to the picture, and performs the processing of the operation event, so that the processing of playing the sound wave in the synthesized network data, which is added to the event, can be invoked. Alternatively, during the aforementioned music playback, the sound wave placed in the ultrahigh frequency band or the ultralow frequency band of the music is sent out at a predefined sending time/occasion.

As the sound wave is played, the sound wave can be sent or propagated to a surrounding environment through the sound apparatus, such as the loudspeaker, of the terminal device of the user. The sound wave that represents the resource data and is transmitted to the surrounding environment can cover a certain area. Terminal devices within that area can receive or intercept the sound wave through sound receiving apparatuses such as microphones of the terminal devices. As can be seen, the present disclosure does not need to add extra receiving and sending hardware structures to a terminal device. Rather, a sound apparatus and a sound receiving apparatus that are necessary for an existing terminal device are utilized. Furthermore, an installation of a corresponding sending and receiving App or driver is not needed, and complicated transmission and propagation processing operations are not needed. But, the sound wave is transmitted and shared freely as other web data is processed.

Block S130 receives the sound wave and parses the sound wave to obtain the resource data by listening to the sound wave representing the resource data.

Through the sound apparatus of the terminal device thereof, the user sends the sound wave representing the resource data in the synthesized network data to the surrounding environment. The surrounding environment includes other users using terminal devices. The sound receiving apparatuses, such as microphones, of these terminal devices can receive and listen to the sound wave, i.e., intercept and receive the sound wave. If supporting HTML5, i.e., supporting the Web Audio API, these terminal devices can parse the received sound wave. Further, the terminal device of the user that sends or propagates the sound wave representing the resource data to the surrounding environment, if supporting HTML5, can also parse the sound wave to obtain the resource data.

The process of parsing the sound wave into the resource data may be referred to as a parsing processing, which is opposite to the process of encoding the resource data into the sound wave (sound wave data). For example, the sound wave data is parsed according to the encoding format in the example of block S110, so as to obtain the resource data represented by the sound wave. Therefore, more users of terminal devices may obtain the resource data.

The sharing of resource data is a process in which a sound wave is listened to, received, and parsed. By intercepting a high-frequency sound wave or a low-frequency sound wave which represents the resource data and is outside the audible wave, the sound wave can be obtained. The sound wave data is then parsed to obtain the resource data. The terminal device capable of performing listening and parsing processing can receive the sound wave of the resource data by means of listening, parse the sound wave to obtain the resource data, and output the resource data in a variety of different manners, for example, present (display/show) the resource data on the terminal device for use, access or view, etc., by the user via the terminal device, thus efficiently and conveniently transmitting and sharing the resource data.

Based on the high-frequency sound wave or the low-frequency wave which is outside the audible wave and is detected by means of listening, the format (data header, data content, data tail, etc.), as described at block S110, of the high-frequency sound wave or the low-frequency wave is analyzed, so as to determine the resource data included therein. The sound wave (sound wave data) is then parsed to restore the resource data, thereby obtaining and outputting the resource data. For example, the resource data is weather forecast information. When a high-frequency sound wave or a low-frequency sound wave is detected by means of listening, a data format of the high-frequency sound wave or the low-frequency wave is analyzed so as to determine that the high-frequency sound wave or the low-frequency wave corresponds to high-frequency or low-frequency sound wave data having a specific data format, which indicates that resource data exists in a frequency band of the sound wave. The sound wave data is decoded to restore the weather forecast information, which is further displayed for viewing. As described in the foregoing example, using the Web Audio API, the resource data is encoded and synthesized with the network data. Based on the format definition of the resource data, the content of the resource data is obtained by parsing. Data integrity is checked, the resource data is displayed. If the resource data is a URL, a prompt for opening the URL is given. In this manner, terminal devices within the coverage of the sound wave can intercept and parse the sound wave, thus achieving a fast, convenient and effective resource data sharing. Moreover, as the resource data is encoded within a frequency band of 21 kHz-41 kHz, when the terminal device detects the frequency band by means of listening, the Web Audio API can further obtain the frequency band of 21 kHz-41 kHz by filtering and then obtain the resource data by parsing. For example, based on respective frequency band information of the network data and the resource data, the frequency band of the received sound wave can be filtered to obtain the resource data, i.e., the sound wave in the frequency band of 21 kHz-41 kHz, with other frequency bands being removed.

Furthermore, the resource data may be obtained in many different ways, i.e., the resource data is outputted and shared for the user in various manners. For example, the resource data may be outputted in a display manner after decoding, and examples of the display manner include: a window, a page, a pop-up window, etc.

As can be seen, other nearby terminal devices that are capable of intercepting and receiving sound waves and even the terminal device that propagates the sound wave, if supporting HTML5, can intercept and receive the sound wave, and quickly decode the sound wave to obtain the resource data. The resource data can be widely shared in a simple and convenient manner. Regardless of whether such resource data is obtained, encoded and propagated by a certain terminal device in real time or is stored in advance and selected to be encoded and propagated, and regardless of whether the resource data is encoded and synthesized with the network data by a terminal device of a user or is encoded and synthesized with the network data by a terminal device of a website administrator (another type of user), once a user of a terminal device performs an operation on the synthesized network data, for example, clicks music on an iPod, the sound wave of the resource data is transmitted to and shared with the surroundings, i.e., the resource data can be shared quickly, widely, and conveniently.

FIG. 3 shows a schematic diagram illustrating the example data processing method 300 as described in the foregoing description. Briefly, a terminal 302 obtains synthesized network data 304 via a network 306. The synthesized network data 304 includes a sound/acoustic wave 308 synthesized with network data 310, with the sound wave 308 being generated by performing an encoding conversion on resource data 312 using Web Audio API 314. Based on an operation performed by a user on the synthesized network data 304 in the terminal 302, an audio playback apparatus of the terminal 302 is invoked to play the sound wave 308 synthesized with the network data 310 to one or more terminals 316 of one or more users nearby. The one or more terminals 316 of the one or more users nearby may then parse and obtain the resource data 312 from the sound wave 308 using the Web Audio API 314 upon detecting and intercepting the sound wave 308.

The following are examples applications of the solution of the present disclosure.

First application, advertisement promotion: A music website encodes advertisement data provided by a partner into an ultrasonic wave using the Web Audio API, and synthesizes the ultrasonic wave to licensed music of the music website. When a user listens to the licensed music of the website for free through Xiami App or a web page via a terminal device (i.e., performs an operation on requested network data), the ultrasonic wave is played simultaneously. Other terminal devices within the coverage of the sound wave (or, further including the terminal device used by the user) listen to the sound wave, parse the sound wave, and therefore, obtain the advertisement, thus realizing the promotion of the advertisement to more users nearby. Further, music content is not affected when the solution of the present disclosure is used. Even fee protection for licensed music can be achieved easily and conveniently as long as a copyright owner of music and a music service provider follow a Web Audio API-based data advertisement protocol of the music protected by copyright.

Second application, donation account transmission: A music website encodes (sound wave) a donation account provided by a partner into a piece of music using the Web Audio API, and the sound wave data of the donation account is within a high-frequency band, i.e., an ultrasonic frequency band. When a user visits the music website via a terminal device and further performs a music playback operation, information about the donation account is also sent out (i.e., transmission of the ultrasonic wave is triggered), which a terminal device within the coverage of the ultrasonic wave intercepts and parses to obtain the account. If the terminal device has an account application program, the terminal can display the account to a user thereof, prompting the user who obtains the account whether to make a donation to the account so as to complete the donation.

Third application, sharing of a cell phone App download address: Cell phone A encodes (sound wave) download address information of an App into a piece of music using the Web Audio API, and uploads the music to a music website. When cell phone B visits the music website and performs music playback, the sound wave of the download address information of the App is also played. If the cell phone B and other cell phones near the cell phone B support the Web Audio API, the sound wave is detected by means of listening when the cell phone B listens to the piece of music, and the cell phone B and the other cell phones near the cell phone B can obtain the download address of the App through parsing. Further, App services in the cell phone B and the other cell phones near the cell phone B can directly complete the download of the App according to the download address of the App, i.e., synchronously detects the sound wave of the download address of the App while listening to the music, obtains the download address information of the App through parsing, and realizes the download processing.

Figure 4:
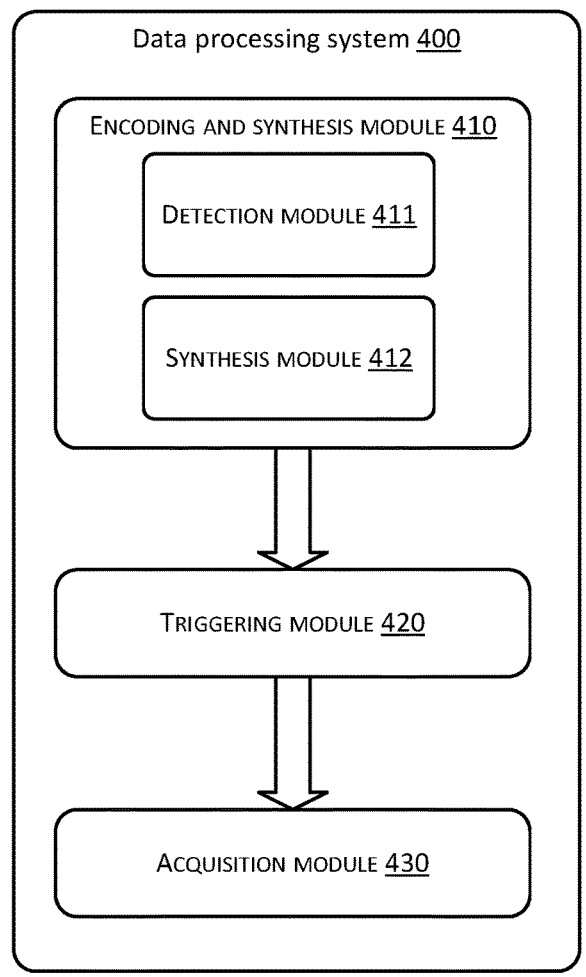
FIG. 4 is a structural diagram of the example data processing system according to the present disclosure.

The present disclosure further provides a data synthesis processing system. As shown in FIG. 4, FIG. 4 is a structural diagram of an example data processing system 400 according to the present disclosure.

The system 400 may include an encoding and synthesis module 410, a triggering module 420, and an acquisition module 430.

The encoding and synthesis module 410 encodes resource data into sound wave data, and synthesizes the sound wave data that represents the resource data with one or more pieces of network data. Block S110 may be referenced for the details of operations implemented by the module 410. It may further include a detection module 411 and a synthesis module 412. Blocks S210 and S220 may be referenced for the details of operations implemented by the modules 411 and 412. The sound wave includes a high-frequency sound wave or a low-frequency sound wave that is inaudible to humans.

The triggering module 420 triggers sending (or transmission or propagation) of the sound wave which represents the resource data in the synthesized network data to the surroundings in response to an operation performed on the synthesized network data to facilitate the propagation and sharing of the sound wave to more (e.g. one or more) other users. Block S120 may be referenced for the details of operations implemented by the module 420.

The acquisition module 430 receives the sound wave to parse the sound wave for obtaining the resource data by intercepting the sound wave that represents the resource data. Block S130 may be referenced for the details of operations implemented by the module 430.

The specific implementations of each module included in the disclosed system that is described in FIG. 4 correspond to the specific implementations of respective blocks in the disclosed method. As FIG. 1 to FIG. 3 have been described in details, specific details of each module are not described hereinafter to avoid putting the present disclosure out of focus.

In a typical configuration, a computing device includes one or more processors (CPU), input/output interfaces, a network interface and memory.

Figure 5:
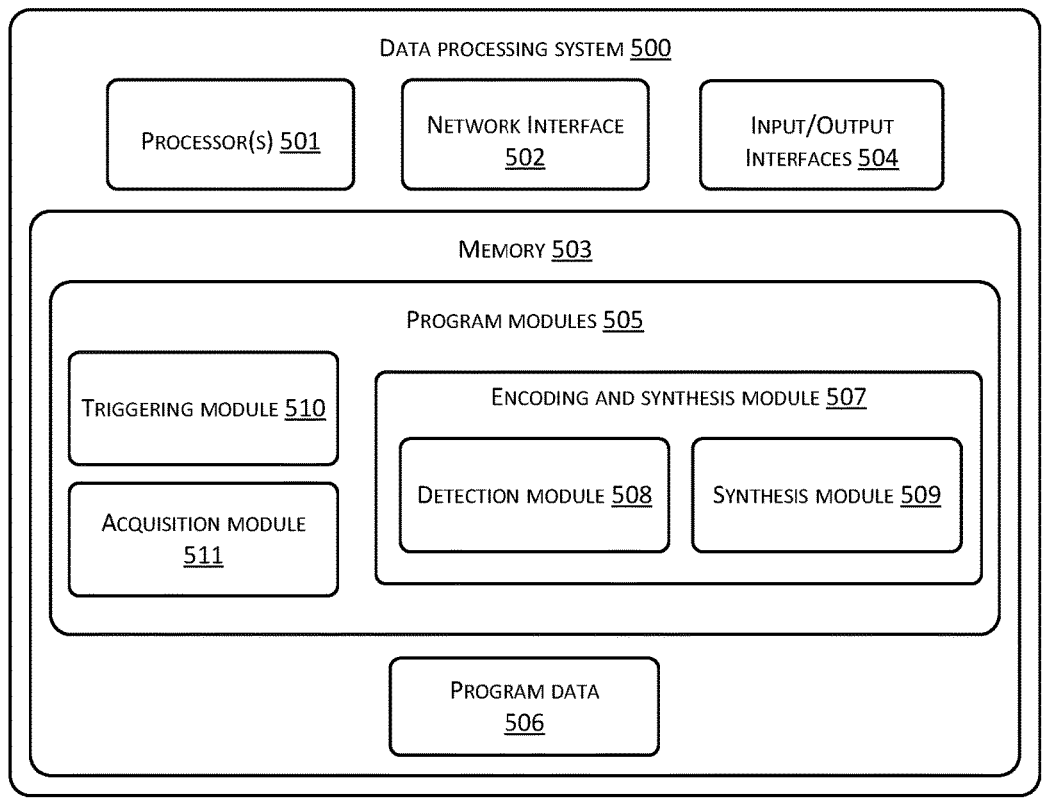
FIG. 5 is a structural diagram of the example data processing system as shown in FIG. 4 in further details.

FIG. 5 shows an example data processing system 500, such as the server as described above, in more detail. In an embodiment, the system 500 may include, but is not limited to, one or more processors 501, a network interface 502, memory 503 and an input/output interface 504.

The memory 503 may include a form of computer readable media, e.g., a non-permanent storage device, random-access memory (RAM) and/or a nonvolatile internal storage, such as read-only memory (ROM) or flash RAM. The memory 503 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 503 may include program modules 505 and program data 506. In one embodiment, the program modules 505 may include an encoding and synthesis module 507 (which may include a detection module 508 and a synthesis module 509), a triggering module 510 and an acquisition module 511. Details of these modules and sub-modules may be found in the foregoing description and are not redundantly described herein.

It should be noted that the terms "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include one . . . " does not exclude any other similar elements from existing in the process, method, product or apparatus.

A person with ordinary skill in the art should understand that the embodiments of the present disclosure can be provided as a method, a system or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The above merely describes the embodiments of the present disclosure, which are not intended to limit the scope of the present disclosure. Various modifications and alternations can be made to the present disclosure by a person with ordinary skill in the art. Any modifications, replacements and improvements within the scope of the spirit and principle of the present disclosure should fall within the scope of the claims of the present disclosure.

What is claimed is:

1. A data processing method comprising:
   obtaining, by a terminal, network data;
   encoding resource data using an application programming interface (API) to generate a sound wave having a data format definition;
   determining that the network data includes audio data;
   analyzing a frequency band structure of the audio data using the API to determine an idle part in the frequency band structure of the audio data, wherein the idle part in the frequency band structure comprises an ultrasonic frequency band or an infrasonic frequency band that is outside an audible frequency band;
   placing the sound wave having the data format definition into the idle part to form synthesized network data if the idle part is not used, or constructing a filter using the API, filtering the idle part through the filter to remove an original sound wave from the idle part and obtain an unused idle part, and placing the sound wave having the data format definition into the idle part to form the synthesized network data; and
   invoking an audio playback apparatus of the terminal to play the sound wave in the synthesized network data to one or more terminals based on an operation on the network data in the terminal.

2. The method of claim 1, further comprising receiving another sound wave from another terminal, parsing and converting the other sound wave to obtain another resource data.

3. The method of claim 1, wherein the encoding further comprises:
   determining that the network data further includes non-audio data;
   parsing the non-audio data using the API;
   determining a user operation event which can be listened to and is associated with the non-audio data; and
   binding a playback of the sound wave having the data format definition to the user operation event which can be listened to and is associated with the non-audio data, the non-audio data becoming a trigger source of the sound wave so that the sound wave having the data format definition is synthesized with the non-audio data to form synthesized non-audio data.

4. The method of claim 1, wherein the operation on the network data in the terminal, comprises:
   the operation on the network data including a playback operation on the audio data, and a playback of the sound wave being triggered based on a predefined playback time of the sound wave so as to send the sound wave to a surrounding environment; or
   the operation on the network data including a user operation event which can be listened to and is associated with non-audio data included in the network data, and the user operation event being invoked to trigger the playback of the sound wave to send the sound wave to the surrounding environment.

5. The method of claim 1, further comprising:
   receiving another sound wave by intercepting the other sound wave; and
   parsing the other sound wave using API based on a data format definition of the other sound wave to obtain another resource data represented by the other sound wave and to output the other resource data.

6. The method of claim 1, further comprising uploading the synthesized network data to a server for storage.

7. The method of claim 1, further comprising uploading the synthesized network data to one or more of accessible websites or sharing devices, to enable a provision of the synthesized network data to a plurality of terminals that access the accessible websites or the sharing devices.

8. The method of claim 1, wherein the data format definition comprises a data header, data content, and a data tail.

9. The method of claim 8, wherein the data header comprises one or more of a type of the resource data, a starting position and an ending position of the data content, or a summary type of the data content, and the data tail comprises a summary of the data content which is used for checking data integrity.

10. A system comprising:
one or more processors;
memory;
an encoding and synthesis module stored in the memory and executable by the one or more processors configured to:
encode resource data into a sound wave having a data format definition using an application programming interface (API),
analyze a frequency band structure of audio data included in network data using the API to determine an idle part in the frequency band structure of the audio data, wherein the idle part in the frequency band structure comprises an ultrasonic frequency band or an infrasonic frequency band that is outside an audible frequency band, and
arrange the sound wave having the data format definition into the idle part to form synthesized network data if the idle part is not used, or construct a filter using the API, filter the idle part through the filter to remove an original sound wave from the idle part and obtain an unused idle part, and arrange the sound wave having the data format definition into the unused idle part to form the synthesized network data; and
a trigger module stored in the memory and executable by the one or more processors configured to invoke an audio playback apparatus according to an operation on network data to play the sound wave in the synthesized network data to one or more terminals.

11. The system of claim 10, further comprising an acquisition module to receive another sound wave from a terminal, parse and convert the other sound wave to obtain another resource data.

12. The system of claim 10, wherein the network data further includes non-audio data, and the encoding and synthesis module is further configured to:
analyze the non-audio data using the API;
determine a user operation event which can be listened to and is associated with the non-audio data;
bind a playback of the sound wave having the data format definition to the user operation event which can be listened to and is associated with the non-audio data, the non-audio data becoming a trigger source of the sound wave so that the sound wave having the data format definition is synthesized with the non-audio data to form synthesized non-audio data.

13. The system of claim 10, wherein the encoding and synthesis module is further configured to upload the synthesized network data to one or more of accessible websites or sharing devices, to enable a provision of the synthesized network data to a plurality of terminals that access the accessible websites or the sharing devices.

14. The system of claim 10, wherein the data format definition comprises a data header, data content, and a data tail.

15. The system of claim 14, wherein the data header comprises one or more of a type of the resource data, a starting position and an ending position of the data content, or a summary type of the data content, and the data tail comprises a summary of the data content which is used for checking data integrity.

16. One or more non-transitory media storing executable instructions that, when executed by one or more processors of a terminal, cause the one or more processors to perform acts comprising:
obtaining network data;
encoding resource data using an application programming interface (API) to generate a sound wave having a data format definition;
determining that the network data includes audio data;
analyzing a frequency band structure of the audio data using the API to determine an idle part in the frequency band structure of the audio data, wherein the idle part in the frequency band structure comprises an ultrasonic frequency band or an infrasonic frequency band that is outside an audible frequency band;
placing the sound wave having the data format definition into the idle part to form synthesized network data if the idle part is not used, or constructing a filter using the API, filtering the idle part through the filter to remove an original sound wave from the idle part and obtain an unused idle part, and placing the sound wave having the data format definition into the idle part to form the synthesized network data; and
invoking an audio playback apparatus of the terminal to play the sound wave in the synthesized network data to one or more terminals based on an operation on the network data in the terminal.

17. The one or more non-transitory media of claim 16, wherein the encoding further comprises:
determining that the network data further includes non-audio data;
parsing the non-audio data using the API;
determining a user operation event which can be listened to and is associated with the non-audio data; and
binding a playback of the sound wave having the data format definition to the user operation event which can be listened to and is associated with the non-audio data, the non-audio data becoming a trigger source of the sound wave so that the sound wave having the data format definition is synthesized with the non-audio data to form synthesized non-audio data.

18. The one or more non-transitory media of claim 16, the acts further comprising uploading the synthesized network data to one or more of accessible websites or sharing devices, to enable a provision of the synthesized network data to a plurality of terminals that access the accessible websites or the sharing devices.

19. The one or more non-transitory media of claim 16, wherein the data format definition comprises a data header, data content, and a data tail.

20. The one or more non-transitory media of claim 19, wherein the data header comprises one or more of a type of the resource data, a starting position and an ending position of the data content, or a summary type of the data content, and the data tail comprises a summary of the data content which is used for checking data integrity.

* * * * *